United States Patent
Park et al.

(10) Patent No.: US 9,342,919 B2
(45) Date of Patent: May 17, 2016

(54) IMAGE RENDERING APPARATUS AND METHOD FOR PREVENTING PIPELINE STALL USING A BUFFER MEMORY UNIT AND A PROCESSOR

(75) Inventors: Chan Min Park, Seoul (KR); Jae Ho Nah, Seoul (KR); Tack Don Han, Seoul (KR); Jeong Soo Park, Gwacheon-si (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 728 days.

(21) Appl. No.: 13/067,531

(22) Filed: Jun. 7, 2011

(65) Prior Publication Data

US 2012/0081368 A1    Apr. 5, 2012

(30) Foreign Application Priority Data

Sep. 30, 2010    (KR) .................. 10-2010-0095178

(51) Int. Cl.
*G06T 15/06*    (2011.01)
*G06T 15/00*    (2011.01)
*G06T 1/20*    (2006.01)

(52) U.S. Cl.
CPC .............. *G06T 15/06* (2013.01); *G06T 15/005* (2013.01); *G06T 1/20* (2013.01)

(58) Field of Classification Search
CPC .......... G06T 15/005; G06T 1/20; G06T 1/60; G06T 15/06; G06T 2200/28; G06T 2210/32; G06T 15/10; G06T 17/00
See application file for complete search history.

(56) References Cited

U.S. PATENT DOCUMENTS

| | | |
|---|---|---|
| 6,341,347 B1 | 1/2002 | Joy et al. |
| 7,012,604 B1 | 3/2006 | Christie et al. |
| 7,289,118 B2 | 10/2007 | Schmittler et al. |
| 7,594,095 B1 | 9/2009 | Nordquist |
| 7,688,320 B2 | 3/2010 | Shearer |
| 7,782,318 B2 | 8/2010 | Shearer |
| 2007/0206008 A1* | 9/2007 | Kaufman ............. G06T 15/005 345/424 |
| 2009/0096788 A1 | 4/2009 | Salsbury et al. |
| 2009/0262132 A1* | 10/2009 | Peterson et al. ............. 345/619 |
| 2009/0265514 A1* | 10/2009 | Biles et al. .................... 711/154 |

(Continued)

FOREIGN PATENT DOCUMENTS

| | | |
|---|---|---|
| JP | 2009-545044 | 12/2009 |
| KR | 10-2008-0020198 | 3/2008 |

(Continued)

OTHER PUBLICATIONS

What is L2 cache: http://web.archive.org/web/20100104065356/http://www.wisegeek.com/what-is-l2-cache.htm.*

(Continued)

*Primary Examiner* — Mark Zimmerman
*Assistant Examiner* — Nurun N Flora
(74) *Attorney, Agent, or Firm* — NSIP Law

(57) ABSTRACT

An image rendering apparatus may include a buffer memory unit and a processor. The buffer memory unit may store input ray data for image rendering according to a ray tracing scheme while shape data corresponding to the input ray data is being fetched from a cache. The processor may output the received shape data together with the input ray data to an operation apparatus.

21 Claims, 6 Drawing Sheets

(56) References Cited

U.S. PATENT DOCUMENTS

| | | | |
|---|---|---|---|
| 2009/0284523 A1 | 11/2009 | Peterson et al. | |
| 2009/0322752 A1 | 12/2009 | Peterson et al. | |
| 2010/0231589 A1* | 9/2010 | Salsbury | G06T 15/06 345/426 |

FOREIGN PATENT DOCUMENTS

| | | |
|---|---|---|
| KR | 10-2008-0052328 | 6/2008 |
| KR | 10-2009-0064155 | 6/2009 |
| KR | 10-2009-0125545 | 12/2009 |
| KR | 10-2010-0042052 | 4/2010 |
| KR | 10-2010-0077423 | 7/2010 |
| KR | 10-2010-0094532 | 8/2010 |
| WO | 2008/012199 | 1/2008 |
| WO | 2009/067351 | 5/2009 |

OTHER PUBLICATIONS

Christiaan P. Gribble et al., "Coherent Ray Tracing Via Stream Filtering," IEEE Symposium on Interactive Ray Tracing 2008, 8 pages, 2008.

John Nickolls et al., "Scalable Parallel Programming with CUDA," ACM Queue, vol. 6, No. 2, pp. 40-53, Mar./Apr. 2008.

Ingo Wald et al., "Interactive Rendering with Coherent Ray Tracing," Computer Graphics Forum, vol. 20, No. 3, 12 pages, Sep. 2001.

* cited by examiner

|  | 210 | | | | 220 | 230 | 240 | 250 |
|---|---|---|---|---|---|---|---|---|
| 201 | R1 | R2 | R3 | R4 | 28 | | 4 | 1 |
| 202 | | | | | 48 | D48 | 0 | 0 |
| 203 | R5 | | | | 14 | | 1 | 0 |
| 204 | R4 | R7 | R8 | | 96 | | 3 | 1 |

| RAY DATA | | |
|---|---|---|
| RAY TYPE | ORIGIN | DIRECTION |
| INVERSE DIRECTION | t INTERVAL | HIT POINT INFO. |
| STACK POINTER | PIXEL POSITION | SHAPE DATA |
| RAY DEPTH | RAY WEIGHT | SHAPE ADDRESS | under
IMAGE RENDERING APPARATUS AND METHOD FOR PREVENTING PIPELINE STALL USING A BUFFER MEMORY UNIT AND A PROCESSOR

CROSS-REFERENCE TO RELATED APPLICATIONS

This application claims the priority benefit of Korean Patent Application No. 10-2010-0095178, filed on Sep. 30, 2010, in the Korean Intellectual Property Office, the disclosure of which is incorporated herein by reference.

BACKGROUND

1. Field

Example embodiments relate to image rendering according to a ray tracing scheme, and more particularly, to an image rendering apparatus and method that may prevent a pipeline stall between a cache and an operation apparatus in an acceleration structure traversal and an intersection test between a ray and a primitive.

2. Description of the Related Art

Three-dimensional (3D) rendering corresponds to image processing for synthesizing 3D object data to an image observed at a given camera viewpoint.

A rendering scheme may include a rasterization scheme of generating an image by projecting a 3D object onto a screen, a ray tracing scheme of generating an image by tracing a path of light incident along a ray towards each pixel at a camera viewpoint, and the like.

The ray tracing scheme may generate a high quality image by using physical properties of light, for example, reflection, refraction, transmission, and the like, to render a result. However, due to a relatively large number of calculations, the ray tracing scheme may be difficult to render at a high speed.

Factors of a ray tracing performance requiring a larger number of calculations may include generation and traversal of an acceleration structure (AS) in which scene objects to be rendered are spatially divided, and an intersection test between a ray and a primitive.

In addition, in a cache positioned between an external memory and an operation apparatus performing the traversal or the intersection test, cache misses may occur whereby latency may result during accesses to the external memory. This latency may deteriorate the total calculation speed.

SUMMARY

The foregoing and/or other aspects are achieved by providing an image rendering apparatus, including a buffer memory unit to store first input ray data for image rendering according to a ray tracing scheme, and a processor to receive, from a cache, first shape data corresponding to the first input ray data, and to output, to an operation apparatus, the first shape data together with the first input ray data.

If the first shape data is not stored within the cache, the processor may receive second input ray data while the first shape data is being fetched from an external memory to the cache.

If second shape data corresponding to the second input ray data has the same cache address as the first shape data, the processor may store the second input ray data in a same row as a row storing the first input ray data within the buffer memory.

If the first shape data is stored in the buffer memory unit, the processor may output the first shape data stored in the buffer memory unit to the operation apparatus together with the first input ray data without requesting the first shape data from the cache.

The buffer memory unit may include a ray storage column region to store the first input ray data, a cache address storage column region to store a cache address of the first shape data; a cache data storage column region to store the first shape data, an occupancy counter storage column region to identify a number of rays stored in the ray storage column region and a valid identification bit storage column region to store a valid identification bit to identify whether the first input ray data stored in the ray storage column region is output to the operation apparatus.

The processor may receive the first shape data corresponding to the first input ray data from the cache, and output the first shape data to a ray traversal operation apparatus together with the first input ray data.

The processor may receive the first shape data corresponding to the first input ray data from the cache, and output the first shape data to a ray intersection test operation apparatus together with the first input ray data.

The foregoing and/or other aspects are achieved by providing an image rendering method, including receiving, by a processor, first input ray data for image rendering according to a ray tracing scheme, determining, by the processor, whether first shape data corresponding to the first input ray data is stored in a buffer memory unit and requesting, by the processor, a cache for the first shape data when the first shape data is not stored in the buffer memory unit.

The image rendering method may further include storing the first input ray in the buffer memory unit before the first shape data is received from the cache.

The image rendering method may further include receiving second input ray before the first shape data is received from the cache, to determine whether second shape data corresponding to the second input ray is stored in the buffer memory unit; and requesting the second shape data from the cache if the second shape data is not stored in the buffer memory unit.

The image rendering method may further include storing the second input ray in the buffer memory unit before the second shape data is received from the cache.

The image rendering method may further include storing the second input ray data in a same row as a row storing the first input ray data within the buffer memory unit when the second shape data has the same cache address as the first shape data.

The image rendering method may further include outputting the first shape data to an operation apparatus together with the first input ray data when the first shape data is received from the cache.

According to another aspect of one or more embodiments, there is provided at least one non-transitory computer readable medium including computer readable instructions that control at least one processor to implement methods of one or more embodiments.

Additional aspects of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of embodiments, taken in conjunction with the accompanying drawings of which:

FIG. 2 illustrates data stored in a buffer memory unit of the image rendering apparatus shown in FIG. 1 according to example embodiments;

FIG. 3 illustrates ray data processed by the image rendering apparatus shown in FIG. 1 according to example embodiments;

DETAILED DESCRIPTION

Figure 1:
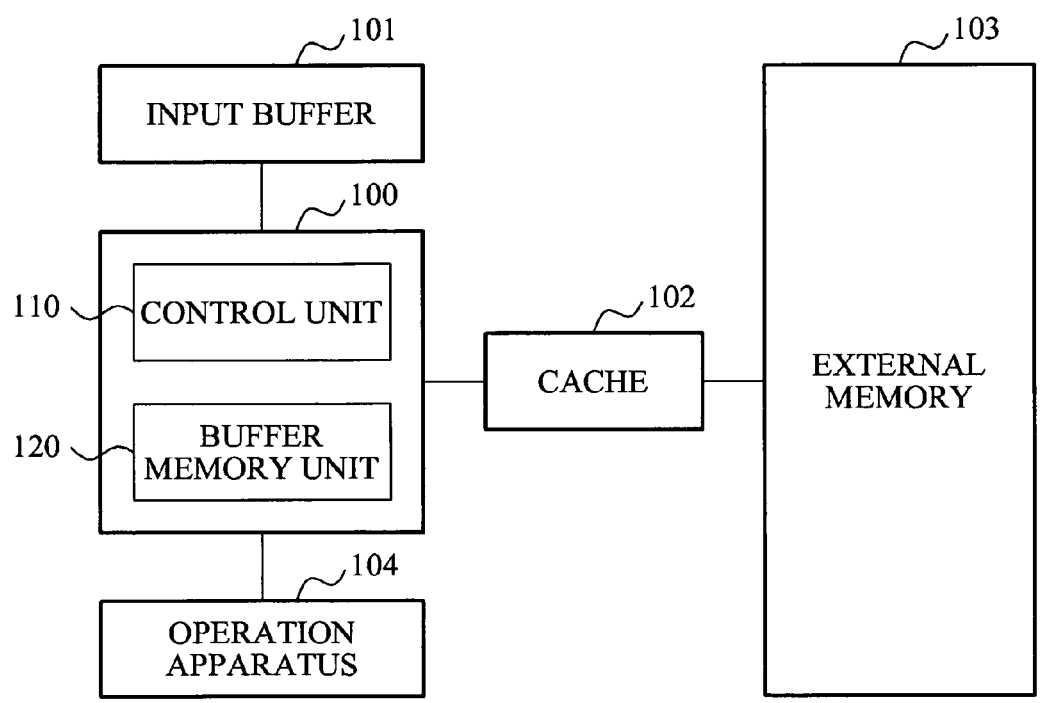
FIG. 1 illustrates an image rendering apparatus according to example embodiments.

Reference will now be made in detail to embodiments, examples of which are illustrated in the accompanying drawings, wherein like reference numerals refer to like elements throughout. Embodiments are described below to explain the present disclosure by referring to the figures.

FIG. 1 illustrates an image rendering apparatus 100 according to example embodiments.

The image rendering apparatus 100 may receive ray data from an input buffer 101 to render an image according to a ray tracing scheme.

An operation apparatus 104 may perform traversal of an acceleration structure in which scene objects to be rendered are spatially divided, perform an intersection test between a ray and a primitive, and the like.

While the operation apparatus 104 is performing the operation of the traversal, the intersection test, and the like, a cache 102 may fetch at least a portion of shape data corresponding to ray data stored in an external memory 103, thereby increasing an operation speed.

In a conventional ray tracing apparatus, the operation apparatus 104 may directly request the cache 102 for the shape data to obtain shape data corresponding to input ray data provided from the input buffer 101.

In such a situation, when the shape data corresponding to the input ray data is present in the cache 102, this is known as a cache hit. When the cache hit occurs, the operation apparatus 104 may directly receive the shape data from the cache 102, and perform the operation of the traversal, perform the intersection test, and the like.

However, if the shape data corresponding to the input ray data is not in the cache 102, this is known as a cache miss. The shape data may need to be fetched from the external memory 103, and the operation apparatus 104 may experience the deterioration in the total operation speed because of the latency occurring as a result of an access of the external memory 103.

When the operation process for ray tracing is pipelined, external memory latency as a result of to the above cache miss penalty may cause the entire pipeline to stall.

Therefore, according to example embodiments, if first shape data corresponding to a first input ray is not stored in the cache 102 and a cache miss occurs, the image rendering apparatus 100 may receive second input ray data from the input buffer 101 and process the second input ray data, thereby hiding the memory access latency while the first shape data is being fetched.

The image rendering apparatus 100 may store input ray data while waiting for the fetch of shape data in a buffer memory unit 120 and thereby enable the input ray data to wait. The image rendering apparatus 100 may also act as a ray accumulation buffer to transfer, to the operation apparatus 104, an input ray of which shape data is received from the cache 102.

The image rendering apparatus 100 may be controlled by a control unit 110, i.e. a processor, and the buffer memory unit 120 may be configured as a predetermined memory apparatus and have a fast read speed.

When the first input data is to be stored within the buffer memory unit 120, the control unit 110 may store first shape data corresponding to the first input data and perform caching using the stored first shape data. Accordingly, the control unit 110 may partially perform the functionality of the cache 102.

For example, when a second input ray corresponding to second shape data having the same cache address as the first shape data is received, the control unit 110 may partially perform the functionality of the cache 102 by providing the stored first shape data together with the second input ray data to the operation apparatus 104 instead of requesting the second shape data from the cache 102.

In this example, when storing the second input ray within the buffer memory unit 120, the control unit 110 may store the second input ray in a same row as a row storing the first input ray and may enhance a processing speed by using a ray coherency. The example embodiments are further described with reference to FIG. 2.

FIG. 2 illustrates data stored in the buffer memory unit 120 of the image rendering apparatus 100 of FIG. 1 according to example embodiments.

The buffer memory unit 120 may include a ray storage column region 210 to store input ray data, a cache address storage column region 220 to store a cache address of shape data, a cache data storage column region 230 to store the shape data corresponding to the ray data, an occupy counter storage column region 240 to identify a number of rays stored in the ray storage column region 210, and a valid identification (ID) bit storage column region 250 to store a valid ID bit used for identifying whether the input data stored in the ray storage column region 210 is output to the operation apparatus 104.

A plurality of rows 201, 202, 203, and 204 may be included in the buffer memory unit 120. Ray data of a plurality of rays waiting for fetch of shape data corresponding to a cache address of the same cache block may be stored in each of the rows 201, 202, 203, and 204.

For example, four rays R1, R2, R3, and R4 stored in the row 201 may be rays corresponding to shape data stored in a cache block having the same cache address 28.

Shape data transferred from the cache 102 may be read based on a block unit. Accordingly, once the shape data is fetched and is transferred based on the block unit, all of the rays R1, R2, R3, and R4 may obtain the shape data.

By storing the rays R1, R2, R3 and R4 in the same row waiting for shape data having the same cache address, it is possible to maximally use the ray coherence between rays.

According to example embodiments, in a ray tracing operation, since the ray coherence is maximally used based on a probability that rays having a time locality may also have a spatial locality is high, it is possible to significantly decrease unnecessary fetches.

Specifically, a group of rays waiting for a fetch of shape data stored in the same cache block may be stored in the ray storage column region 210 of the same row, and a cache address of the cache block may be stored in the cache address storage column region 220.

When the shape data of the cache block is fetched and is received, the cache block may be stored in the cache data storage column region 230 of the same row.

A number of rays stored as above may be stored in the occupancy counter storage column region 240.

Even though shape data stored in the cache data storage column region 230 is provided with respect to rays stored in a predetermined row and the rays are output to the operation apparatus 104, an ID bit of the valid ID bit storage column region 250 may be changed to be an invalid bit, for example, '0' and the shape data may not be immediately deleted and be reused later. This is an example of an erase policy.

When new input ray data is received from the input buffer 101, the control unit 110 of the image rendering apparatus 100 may determine whether a cache address of shape data corresponding to the new input ray data is stored in the cache address storage region 220 of the buffer memory unit 120.

When the cache address of the shape data corresponding to the new input ray data is stored in the cache address storage column region 220, the control unit 110 may output, to the operation apparatus 104, the shape data of the cache data storage column region 230 of a same row as a row storing the cache address together with the new input ray data.

In this example, the control unit 110 need not request the cache 102 for shape data. Further, a cache hit or a cache miss at the cache 102 need not occur and fetch is not be required. Specifically, the image rendering apparatus 100 may perform the functionality of the cache 102.

If the cache address of the shape data corresponding to the new input ray data is not stored in the cache address storage column region 220 as a result of the determination, the control unit 110 may transfer the cache address of the shape data to the cache 102 and request the shape data from the cache 102.

Next, it may be determined whether the shape data of the requested cache address is present in the cache 102, i.e., the cache hit or the cache miss may be determined.

If there is the cache hit, the cache 102 may provide the shape data to the image rendering apparatus 100 based on a block unit. The control unit 110 may store the shape data in the cache data storage column region 230, and may output the shape data to the operation apparatus 104 together with the new input ray.

Conversely, if there is the cache miss, the shape data may need to be fetched from the external memory 103 to the cache 102. In this example, as a result of a memory access latency, the control unit 110 may store the new input ray in the ray storage column region 210 and wait for the fetch.

When a ray waiting for the fetch is stored in the ray storage column region 210, a counter value of the occupancy counter storage column region 240 may increase by '1' and an ID bit of the valid ID bit storage column region 250 may be changed to be a valid bit, for example, '1.'

When the ID bit of the valid ID bit storage column region 250 is '1' this indicates that it is valid, and indicates that a ray waiting to be fetched and needing to be output after the fetch is present in a corresponding row.

FIG. 3 illustrates ray data 211 processed by the image rendering apparatus 100 of FIG. 1 according to example embodiments.

The ray data 211 may be input from the input buffer 101 to the image rendering apparatus 100.

In this example, the ray data 211 may include a ray type, for example, a primary ray, a shadow ray, and the like, an origin that is a start point, a direction that is a direction vector, an inverse direction that is an inverse direction vector, an interval value of t, for example, tmix and tmax, intersection information, t, u, v, and an index of an intersecting primitive, a stack pointer, a pixel position in shading, shape data used when the operation apparatus 104 performs traversal, an intersection test, and the like, a current reflexive depth of a ray that is a ray depth, a weight value for each color of a ray, a shape address such as a node address, for example, a memory address storing shape data used for an operation, and the like. In addition to the above, other values may be further included in the ray data 211.

Figure 4:
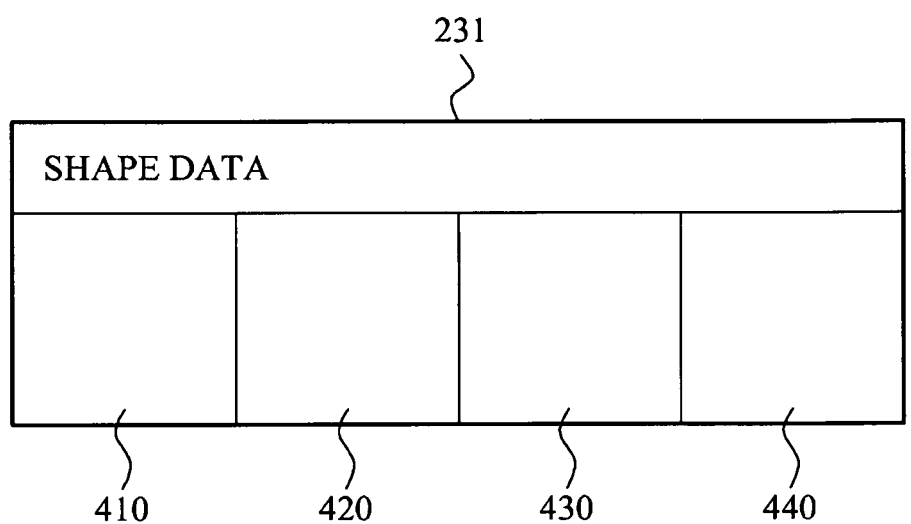
FIG. 4 illustrates shape data stored in the buffer memory unit of the image rendering apparatus shown in FIG. 1 according to example embodiments.

FIG. 4 illustrates shape data 231 stored in the buffer memory unit 120 of the image rendering apparatus 100 of FIG. 1 according to example embodiments.

The shape data 231 may be different depending on a type of the operation apparatus 104. The shape data 231 may be data of an acceleration structure, for example, a node of a kd-tree, a node of a bounding volume hierarchy (BVH), list data of primitives, and the like, and data of geometry information, for example, a triangle and the like.

If the shape data corresponds to an acceleration structure such as the kd-tree node, the BVH, and the like, a flag, a split value, a node/list point, and a number of primitives may be respectively stored in regions 410, 420, 430, and 440 which make up the shape data 231.

The shape data corresponds to an acceleration structure of a spatial division scheme, for example, list data, a primitive point and the like may be stored in the regions 410, 420, 430, and 440 which make up the shape data 231.

When primitive values for an operation of an intersection test and the like, for example, triangle data are shape data, polygon information such as vertex 0, vertex 1, vertex 3, and the like, the values may be stored in the regions 410, 420, 430, and 440.

Figure 5:
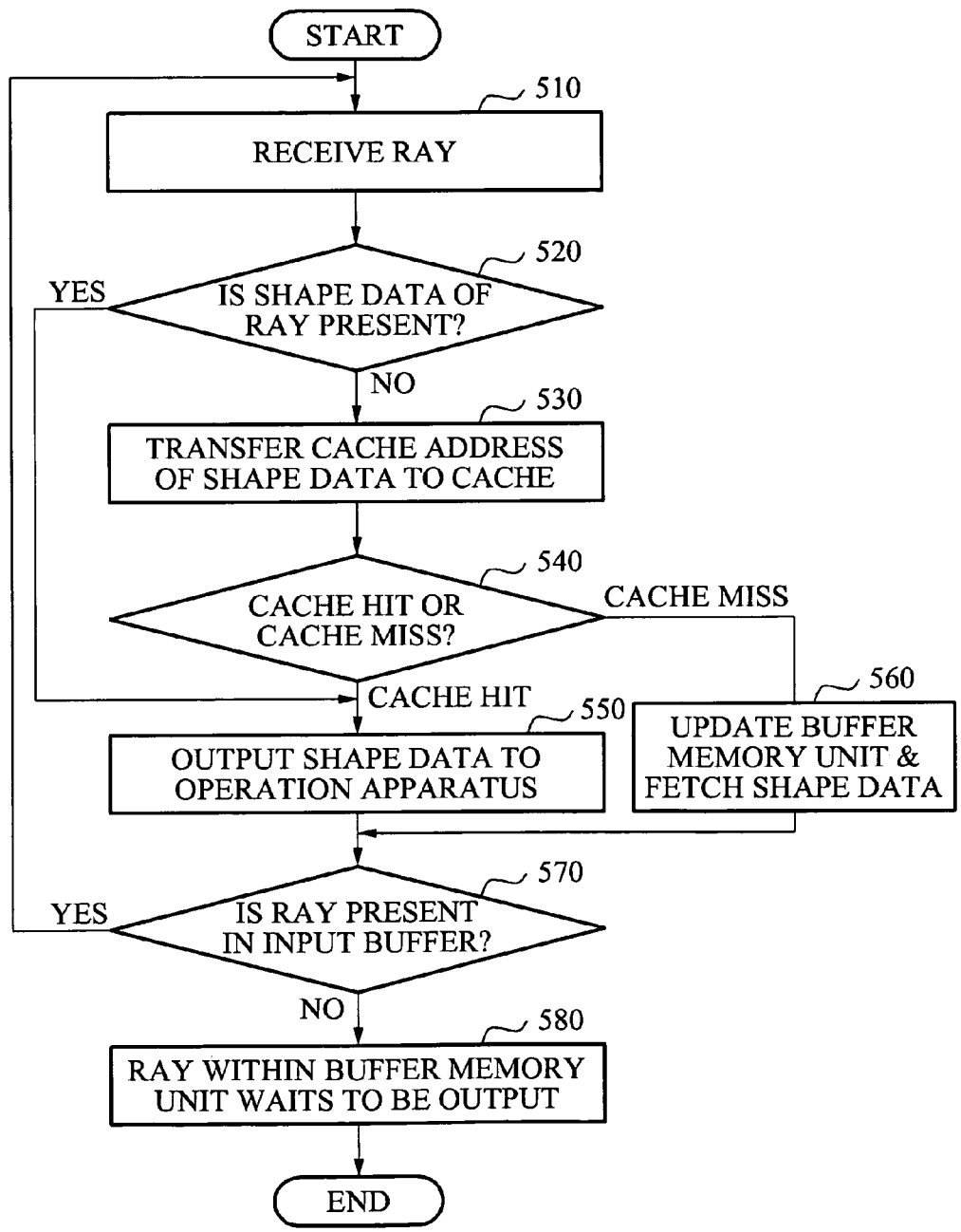
FIG. 5 illustrates a image rendering method according to example embodiments.

FIG. 5 illustrates an image rendering method according to example embodiments.

When new input ray data is received from the input buffer 101 in 510, the control unit 110 of the image rendering apparatus 100 may determine whether a cache address of shape data corresponding to the new input ray data is stored in the cache address storage region 220 of the buffer memory unit 120 in 520.

When the cache address of the shape data corresponding to the new input ray data is stored in the cache address storage column region 220, the control unit 110 may go to 550 and output to the operation apparatus 104 shape data of the cache data storage column region 230 of a same row as a row storing the cache address together with the new input ray data.

In this example, the image rendering apparatus 100 may perform the functionality of the cache 102, as described above.

Conversely, when the cache address of the shape data corresponding to the new input ray data is not stored in the cache address storage column region 220, the control unit 110 may transfer the cache address of the shape data to the cache 102 and request shape data from the cache 102 in 530.

In 540, a cache hit or a cache miss may be determined, i.e., whether the shape data of the requested cache address is present within the cache 102.

If the cache hit occurs in 540, the cache 102 may provide the shape data to the image rendering apparatus 100 based on a block unit.

In 550, the control unit 110 may store the provided shape data in the cache data storage column region 230 and may output the shape data to the operation apparatus 104 together with the new input ray.

If the cache miss occurs in 540, the shape data may need to be fetched from the external memory 103 to the cache 102 in 560. In this example, because of memory access latency, the control unit 110 may store the new input ray in the ray storage column region 210 and enable the input ray to wait for the fetch.

In this example, the control unit 110 may update the buffer memory unit 120 by increasing a counter value of the occupancy counter storage column region 240 by '1', and by changing an ID bit of the valid ID bit storage column region 250 to be a valid bit such as '1.'.

If the input ray data is directly output to the operation apparatus 104, or when the input ray data stored in the buffer memory unit 120 through the above process, the control unit 110 may determine whether a ray to be processed in the input buffer 101 is present in 570. If the ray is determined to be present, a process followed by 510 may be repeated.

When the ray is determined to be absent, rays stored in rows having a valid bit of '1' in the valid ID bit storage column 250 of the buffer memory unit 120 may wait to be output in 580.

Figure 6:
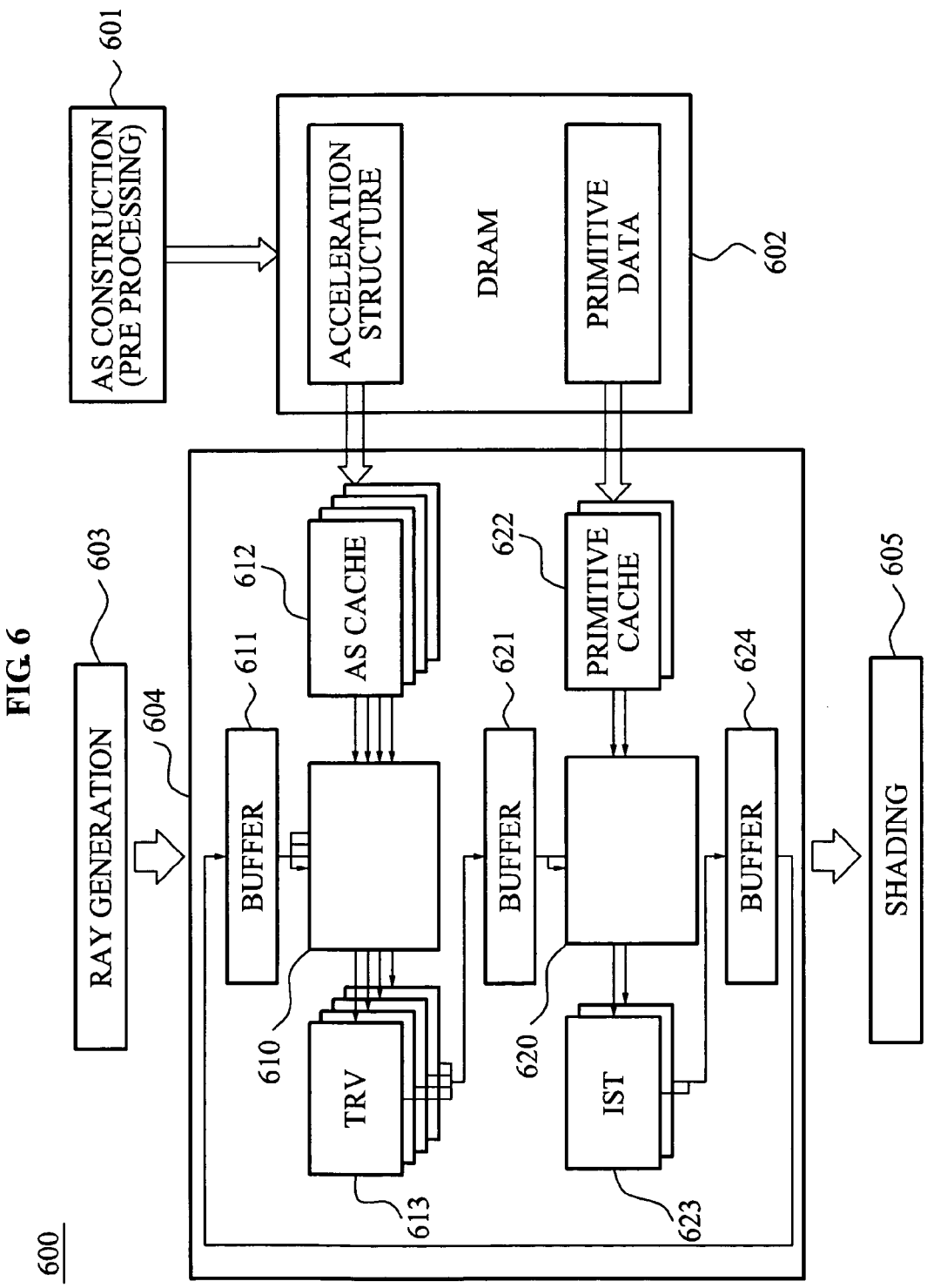
FIG. 6 illustrates a total ray tracing process including the image rendering apparatus shown in FIG. 1 according to example embodiments.

FIG. 6 illustrates a total ray tracing process 600 including the image rendering apparatus of FIG. 1 according to example embodiments.

When construction of an acceleration structure is performed as a preprocessing process of ray tracing in 601, the constructed acceleration structure and primitive data may be stored in an external memory, for example, a dynamic random access memory (DRAM) in 602.

When a ray is generated in 603, a traversal (TRV) may be performed with respect to the ray regarding which leaf node within the acceleration structure is associated with respect to the ray in 604.

In 604, at least a portion of the acceleration structure may be fetched to an acceleration structure (AS) cache 612 and used.

A image rendering apparatus 610 according to other example embodiments may act as a ray accumulation buffer for a TRV operation or a higher layer cache to the AS cache 612 according to the example embodiments described above with reference to FIG. 1 through FIG. 5, among the AS cache 612, an input buffer 611, and TRV 613.

An intersection test (IST) with the ray may be performed with respect to a plurality of primitives, for example, triangles within a predetermined leaf node. Primitive data that is an intersection test target may be fetched to a primitive cache 622 and used.

An image rendering apparatus 620 according to example embodiments may act as a ray accumulation buffer for an IST operation or a higher layer cache to the primitive cache 622 according to the example embodiments described above with respect to FIG. 1 through FIG. 5, among the primitive cache 622, an input buffer 621, and IST 623.

Thus, even if the IST operation is terminated, the corresponding result may be stored in an output buffer 624 and a shader of a ray tracing apparatus may perform shading of a color value based on the result in 605.

The above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it should be appreciated by those skilled in the art that changes may be made in these embodiments without departing from the principles and spirit of the disclosure, the scope of which is defined by the claims and their equivalents.

What is claimed is:

1. An image rendering apparatus for image rendering, according to a ray tracing scheme of a plurality of rays, comprising:
    a buffer memory unit comprising a table with rows, wherein each row is configured to include
        a ray storage region, configured to store ray data of at least zero rays, wherein all rays stored in a row are linked to shape data stored at a single cache address,
        a cache address storage region, configured to store a cache address corresponding to shape data, to which the rays in the ray storage region of the row are correlated,
        a cache data storage region, configured to store shape data,
        an occupancy counter storage region, configured to store the quantity of rays in the ray storage region of the row, and
        a valid identification bit storage region, configured to store a valid identification bit configured to identify whether or not the ray data stored in the ray storage region is to be output to an operation apparatus; and
    a processor configured to:
        request shape data from a cache, when the shape data is not stored in the buffer memory unit,
        wherein when the shape data is in the cache, receive the shape data from the cache, and output the shape data together with corresponding ray data in the row of the buffer memory unit to the operation apparatus, and
        wherein when the shape data is not in the cache, store in the row of the buffer memory unit a cache address corresponding to the shape data, and store ray data in the row of the buffer memory unit.

2. The image rendering apparatus of claim 1, wherein the processor is further configured to, in response to shape data being stored in the buffer memory unit, output shape data stored in the buffer memory unit to the operation apparatus together with ray data without requesting the cache for shape data.

3. The image rendering apparatus of claim 1, wherein the processor is configured to receive shape data corresponding to ray data from the cache, to output shape data together with the ray data to a ray traversal operation apparatus.

4. The image rendering apparatus of claim 1, wherein the processor is configured to receive shape data corresponding to ray data from the cache, to output shape data together with the ray data to a ray intersection test operation apparatus.

5. The image rendering apparatus of claim 1, wherein a group of rays correlated to the shape data stored in the single cache address are stored together in a row of the buffer memory unit.

6. The image rendering apparatus of claim 1,
wherein the processor is further configured to, in response to shape data not being stored within the cache, receive data of an additional ray while shape data is being fetched from an external memory to the cache, and
wherein the processor is further configured to, in response to the shape data being fetched from the external memory to the cache, output the fetched first shape data to the operation apparatus with the data of an additional ray, instead of requesting additional shape data from the cache.

7. The image rendering apparatus of claim 6, wherein the processor is further configured to, in response to additional shape data corresponding to the data of an additional ray corresponding to the cache address, store the data of an additional ray in the row with the ray data.

8. The image rendering apparatus of claim 1, wherein the ray data comprises at least one of:
an origin point,
a direction vector,
an inverse direction vector,
a time interval value,
intersection information,
an index of an intersecting primitive,
a stack pointer,
a pixel position in shading,
shape data for use by the operation apparatus for a traversal test or an intersection test,
a current reflexive depth of a ray, and
a weight value for each color of a ray.

9. An image rendering method, comprising:
receiving, by a processor, ray data for image rendering;
determining, by the processor, whether or not shape data corresponding to ray data is stored in a buffer memory unit, the buffer memory unit comprising a table with rows, wherein each row includes
a ray storage region, configured to store ray data of at least zero rays, wherein all rays stored in a row are linked to shape data stored at a single cache address,
a cache address storage region, configured to store a cache address corresponding to shape data, to which the rays in the ray storage region of the row are correlated,
a cache data storage region, configured to store shape data,
an occupancy counter storage region, configured to store the quantity of rays in the ray storage region of the row, and
a valid identification bit storage region, configured to store a valid identification bit configured to identify whether or not the ray data stored in the ray storage region is to be output to an operation apparatus;
requesting, by the processor, for shape data from a cache, when the shape data is not stored in the buffer memory unit,
wherein when the shape data is in the cache, receive the shape data from the cache, and output the shape data together with corresponding ray data, to the operation apparatus, and
wherein when the shape data is not in the cache, store a cache address corresponding to the shape data, and store the corresponding ray data, in the buffer memory unit.

10. The image rendering method of claim 9, further comprising:
storing the ray data in the buffer memory unit, before shape data is received from the cache.

11. The image rendering method of claim 9, further comprising:
outputting the shape data, together with ray data, to an operation apparatus, in response to the shape data being received from the cache.

12. The image rendering method of claim 11, wherein the outputting comprises outputting the shape data, together with the ray data, to a ray traversal operation apparatus.

13. The image rendering method of claim 11, wherein the outputting comprises outputting the shape data, together with ray data, to a ray intersection test operation apparatus.

14. The image rendering method of claim 9,
wherein the determining comprises determining whether or not a cache address of first shape data corresponding to the ray data is stored in the buffer memory unit; and
wherein the requesting comprises requesting for the shape data from a cache, when the cache address of the shape data is not stored in the buffer memory unit.

15. The image rendering method of claim 9, further comprising:
receiving, by the processor, data of an additional ray, while the shape data is being fetched from an external memory to the cache,
wherein if the shape data is fetched from the external memory to the cache, the processor outputs the fetched shape data to the operation apparatus with the data of an additional ray, instead of requesting additional shape data from the cache.

16. The image rendering method of claim 15, further comprising:
storing the data of an additional ray in the row of the buffer memory unit with the ray data, when the additional shape data corresponds to the cache address.

17. The image rendering method of claim 9, wherein the ray data comprises at least one of:
an origin point,
a direction vector,
an inverse direction vector,
a time interval value,
intersection information,
an index of an intersecting primitive,
a stack pointer,
a pixel position in shading,
shape data for use by the operation apparatus for a traversal test or an intersection test,
a current reflexive depth of a ray, and
a weight value for each color of a ray.

18. At least one non-transitory computer-readable medium comprising computer readable instructions that control at least one processor to implement the method of claim 9.

19. An image rendering system, comprising:
a cache configured to store shape data corresponding to ray data stored in an buffer; and
an image rendering apparatus configured to render an image, comprising:
a buffer memory unit comprising a table with rows, wherein each row includes a ray storage region, configured to store ray data of at least zero rays, wherein all rays stored in a row are linked to shape data stored at a single cache address, a cache address storage region, configured to store a cache address corresponding to shape data, to which the rays in the ray storage region of the row are correlated, a cache data storage region, configured to store shape data, an occupancy counter storage region, configured to store the quantity of rays in the ray storage region of the row, and a valid identification bit storage region, configured to store a valid identification bit configured to identify whether or not the ray data stored in the ray storage region is to be output to an operation apparatus; and a controller, including at least one processing device, configured to:

request shape data from a cache, when the shape data is not stored in the buffer memory unit, wherein when the shape data is in the cache, receive the shape data from the cache, and output the shape data together with corresponding ray data in the row of the buffer memory unit to the operation apparatus, and wherein when the shape data is not in the cache, store in the row of the buffer memory unit a cache address corresponding to the shape data, and store ray data in the row of the buffer memory unit.

20. The image rendering system of claim 19, wherein the controller is further configured to, in response to the shape data not being stored within the cache, receive a data of an additional ray while shape data is being fetched from an external memory to the cache, and wherein the controller is further configured to, in response to the shape data being fetched from the external memory to the cache, output the fetched shape data to the operation apparatus with the data of an additional ray, instead of requesting the additional shape data from the cache.

21. The image rendering system of claim 19, wherein the ray data comprises at least one of:

an origin point,
a direction vector,
an inverse direction vector,
a time interval value,
intersection information,
an index of an intersecting primitive,
a stack pointer,
a pixel position in shading,
shape data for use by the operation apparatus for a traversal test or an intersection test,
a current reflexive depth of a ray, and
a weight value for each color of a ray.

* * * * *